US009321453B2

(12) United States Patent
Jeong

(10) Patent No.: US 9,321,453 B2
(45) Date of Patent: Apr. 26, 2016

(54) ENGINE CLUTCH CONTROL SYSTEM FOR HYBRID VEHICLE AND METHOD OF CONTROLLING ENGINE CLUTCH

(71) Applicants: Hyundai Motor Company, Seoul (KR); Kia Motors Corporation, Seoul (KR)

(72) Inventor: Seok Min Jeong, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/095,500

(22) Filed: Dec. 3, 2013

(65) Prior Publication Data
US 2014/0297073 A1 Oct. 2, 2014

(30) Foreign Application Priority Data
Mar. 26, 2013 (KR) .................... 10-2013-0032186

(51) Int. Cl.
| | | |
|---|---|---|
| *B60W 20/00* | (2006.01) | |
| *B60W 10/02* | (2006.01) | |
| *B60W 10/04* | (2006.01) | |
| *B60K 6/547* | (2007.10) | |
| *B60K 6/48* | (2007.10) | |

(52) U.S. Cl.
CPC ............... *B60W 20/40* (2013.01); *B60K 6/547* (2013.01); *B60W 10/02* (2013.01); *B60K 2006/4825* (2013.01); *B60W 2510/0695* (2013.01); *B60W 2530/10* (2013.01); *Y02T 10/6252* (2013.01); *Y10S 903/902* (2013.01)

(58) Field of Classification Search
CPC ..... B60W 20/40; B60W 10/02; B60W 10/06; B60W 10/08; B60W 2530/10; B60W 2510/0695; B60K 6/547; B60K 2006/4825; Y10S 903/902

See application file for complete search history.

(56) References Cited

U.S. PATENT DOCUMENTS

| | | | |
|---|---|---|---|
| 6,823,954 B2 | 11/2004 | Shimabukuro et al. | |
| 2007/0259755 A1* | 11/2007 | Tanishima | 477/3 |
| 2009/0312895 A1* | 12/2009 | Kim et al. | 701/22 |
| 2010/0312427 A1* | 12/2010 | Ueno | 701/22 |
| 2012/0053768 A1* | 3/2012 | Jeon | 701/22 |

FOREIGN PATENT DOCUMENTS

| | | |
|---|---|---|
| JP | 2006-118681 A | 5/2006 |
| JP | 2012-086676 A | 5/2012 |
| KR | 1020110062133 | 6/2011 |
| KR | 1020110062134 | 6/2011 |

* cited by examiner

*Primary Examiner* — Michael J Zanelli

(74) *Attorney, Agent, or Firm* — Mintz Levin Cohn Ferris Glovsky and Popeo, P.C.; Peter F. Corless

(57) ABSTRACT

An engine clutch control system for a hybrid vehicle has a power source including an engine and a motor, an engine clutch between the engine and the motor, a traveling information detector that detects traveling information including at least one of the vehicle speed, shift gear, displacement of the accelerator pedal, and displacement of the brake pedal, and a hybrid controller that selects an EV mode or HEV mode by controlling disengagement or engagement of the engine clutch. A method of controlling the engine clutch includes determining whether there is a request for changing into the HEV mode from the EV mode; determining a reference speed from traveling inertia of the vehicle and inertia of the engine and the motor; determining a desired speed for controlling the determined reference speed; and calculating transmission torque of the engine clutch.

18 Claims, 4 Drawing Sheets

ENGINE CLUTCH CONTROL SYSTEM FOR HYBRID VEHICLE AND METHOD OF CONTROLLING ENGINE CLUTCH

CROSS-REFERENCE TO RELATED APPLICATION

This application claims under 35 U.S.C. §119(a) priority to and the benefit of Korean Patent Application No. 10-2013-0032186 filed in the Korean Intellectual Property Office on Mar. 26, 2013, the entire contents of which are incorporated herein by reference.

BACKGROUND (a) Field of the Invention

The present invention relates to an engine clutch control system for a hybrid vehicle which controls engagement of an engine clutch, and a method of controlling the engine clutch.

(b) Description of the Related Art

Demand for environmentally-friendly vehicles is increasing, and hybrid vehicles are provided as a practical alternative to vehicles having only a gasoline engine.

Although hybrid vehicles can be distinguished from fuel cell vehicles and electric vehicles in a narrow sense, hybrid vehicles as described herein refer to vehicles equipped with one or more batteries and using the energy stored in the batteries for driving themselves.

Hybrid vehicles typically are equipped with an engine and a motor, which are power sources, and improvement of fuel efficiency and reduction of exhaust gases can be achieved by the characteristics of the engine and the motor which depend on traveling circumstances.

Hybrid vehicles can be provided with an optimal output torque, depending on how the engine and the motor are operated while the vehicles are driven by the two power sources, that is, the engine and the motor.

For hybrid vehicles, a TMED (Transmission Mounted Electric Device) type of power train is generally used, an engine clutch is disposed between the two power sources, the engine and the motor, and they travel in an EV mode or an HEV mode in accordance with engagement (connection) of the engine clutch.

In general, hybrid vehicles determine the engagement timing of the engine clutch and control the engagement (connection) of the engine clutch to reduce shock and satisfy the starting performance when engaging (connecting) the engine clutch while changing into the HEV (Hybrid Electric Vehicle) mode from the EV (Electric Vehicle) mode.

When engaging (connecting) the engine clutch to change into the HEV mode from the EV mode, the ways of engaging the engine clutch are different in accordance with the status and condition of the vehicles.

It is known to require significant testing and effort to satisfy the required performance of a hybrid vehicle, including considering all operating conditions, and the engagement performance of the engine clutch may be changed in accordance with the magnitude and the inclination of the reference speed and the relative speed even under the same speed difference.

The above information disclosed in this Background section is only for enhancement of understanding of the background of the invention and therefore it may contain information that does not form the prior art that is already known in this country to a person of ordinary skill in the art.

SUMMARY

The present invention provides an engine clutch control system and method of controlling an engine clutch in a hybrid vehicle having advantages of providing optimal engine clutch engagement performance by determining a reference speed based on inertia of power sources and traveling inertia, and by controlling engagement (connection) of the engine clutch based on transmission torque of the engine clutch.

An exemplary embodiment of the present invention provides an engine clutch control system for a hybrid vehicle, which includes: a power source including an engine and a motor; an engine clutch disposed between the engine and the motor; a traveling information detector that detects traveling information including at least one of a vehicle speed, a shift gear, displacement of an accelerator pedal, and displacement of a brake pedal; and a hybrid controller performing an EV mode or an HEV mode by controlling disengagement or engagement of the engine clutch, in which the hybrid controller may control engagement of the engine clutch in accordance with inertia of the vehicle and transmission torque from the engine clutch, if there is a request for changing into the HEV mode from the EV mode.

The inertia of the vehicle may include the inertia of the power source and traveling inertia.

The hybrid controller may determine a reference speed from the inertia of the power source and the traveling inertia and engage the engine clutch by applying hydraulic pressure when the amount of torque transmitted through the engine clutch is included in a predetermined range.

The hybrid controller may determine the reference speed on the basis of the traveling inertia of the vehicle.

The hybrid controller may set any one of the vehicle speed and a motor speed as the reference speed and determine the speed of the engine as a relative speed, when a transmission is in a normal status.

The hybrid controller may control the reference speed by controlling any one of the motor and the engine, when the relative speed is determined.

The hybrid controller may control viscous friction force of the fluid in the engine clutch and torque from the output of the engine, and may determine a desired speed to reference speed±correction speed (difference between the output torque of the engine and a viscous friction force in the engine clutch) so that there is no torque at the slip start point (engagement timing) of the engine clutch.

The hybrid controller may control an engine speed that is the relative speed by performing PI control on a motor/generator synchronized with the engine, or control the rotation speed of the engine with reference to the desired speed in cooperation with an EMS.

The hybrid controller may calculate transmission torque of the engine clutch to engage the engine clutch, when the reference speed and the relative speed are determined.

The hybrid controller may determine a start point where the engine clutch starts to be engaged in accordance with the magnitude of torque F (Δrpm, fluid temperature in the clutch) due to the viscous friction force of fluid in the engine clutch and the torque from the output shaft of the engine in order to calculate the transmission torque from the engine clutch.

The hybrid controller may determine the torque from the output shaft of the engine by subtracting friction torque generated in the strokes of the engine from engine torque (engine inertia torque) generated by combustion in the engine.

The hybrid controller may control the sum of the torque due to the viscous friction force of the fluid in the engine clutch and the output torque of the engine to be close to 0 [Nm]±Margin [Nm] and keeps this status for a predetermined time, determines that it is the start point where the engine clutch starts slipping (engaging) and controls engagement of the engine clutch, when the rotation speed difference (Δrpm) of the engine speed and the motor speed is within a predetermined value.

The hybrid controller may set a margin and a holding time by applying hysteresis to the sum (transmission torque) of the torque due to the viscous friction force of the engine clutch and the torque from the output shaft of the engine.

Another exemplary embodiment of the present invention provides a method of controlling an engine clutch for a hybrid vehicle, which includes: determining whether there is a request for changing into an HEV mode from an EV mode; determining a reference speed from traveling inertia of the vehicle and inertia of an engine and a motor when there is the request for changing into the HEV mode; determining a desired speed for controlling the determined reference speed; and calculating transmission torque of the engine clutch, and engaging the engine clutch, when the transmission torque of the engine clutch is provided in a predetermined range.

The reference speed may be determined on the basis of a traveling inertia speed of the vehicle, because the traveling inertia of the vehicle is larger than the inertia of the engine and the inertia of the engine is larger than the inertia of the motor.

As described above, according to the present invention, the vehicle speed having relative large inertia is used as a reference speed in a function for engaging an engine clutch in a hybrid vehicle, such that it is possible to ensure stable performance in engaging the engine clutch and ensure strength against the amount of slip.

Further, since the engagement timing of the engine clutch is set on the basis of a consistent reference regardless of the type of engaging the engine clutch in accordance with the status of the vehicle, an external influence in setting a desired speed is reduced and it is easy to control engagement of the engine clutch.

Further, since the engine clutch is engaged on the basis of the speed difference at both ends when the engine clutch is connected, and the input torque (engine output torque+viscous friction force) is controlled to be close to '0' [Nm] in consideration of the viscous friction force of the clutch and the engine output torque at the timing of allowing engagement of the engine clutch, it is possible to improve performance of engaging the engine clutch.

DETAILED DESCRIPTION OF THE EMBODIMENTS

Figure 1:
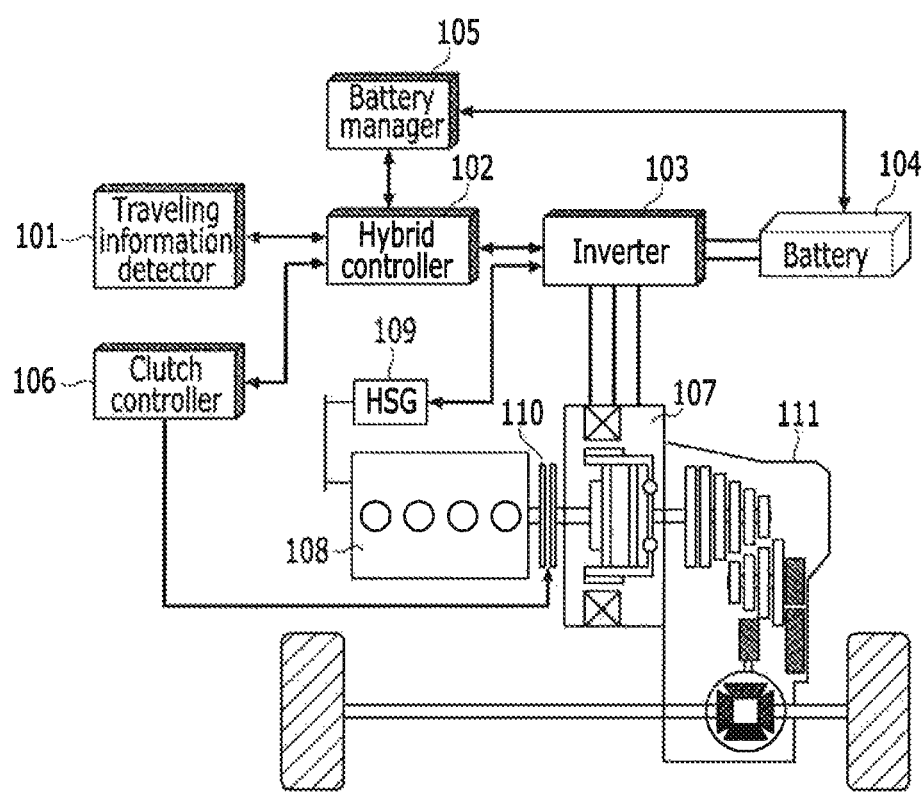
FIG. 1 is a diagram schematically illustrating an engine clutch control system for a hybrid vehicle according to an exemplary embodiment of the present invention.

Hereinafter, the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

As provided herein, like reference numerals designate like element throughout the specification.

The configurations are optionally shown in the drawings for the convenience of description and the present invention is not limited to the drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, as provided herein, environmentally-friendly vehicles include fuel cell vehicles, electric vehicles, plug-in electric vehicles, and hybrid vehicles, and the like, and preferably are equipped with one or more motors and an engine.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

FIG. 1 is a diagram schematically illustrating an engine clutch control system for a hybrid vehicle according to an exemplary embodiment of the present invention.

Referring to FIG. 1, an exemplary embodiment of the present invention includes a driving/traveling information detector 101, a hybrid controller 102, an inverter 103, a battery 104, a battery manager 105, a clutch controller 106, a motor 107, an engine 108, an HSG (Hybrid Starter and Generator) 109, an engine clutch 110, and a transmission 111.

The driving information detector 101 detects the overall traveling information including the vehicle speed, the shift gear, the displacement of the accelerator pedal, and the displacement of the brake pedal while a hybrid vehicle travels, and provides the information to the hybrid controller 102.

The hybrid controller 102 controls one or more controllers connected by a network and performs an HEV mode by engaging the engine clutch 110 disposed between the engine 108 and the motor 107 by means of the clutch controller 106 when it is required to change into the HEV mode, on the basis of a driving request from the driving information detector 101 and the SOC (State Of Change) of the battery 104 from the battery manager 105 in an EV mode.

The hybrid controller 102 determines a reference speed from the inertia of the engine 108 and the motor 107, which are two power sources, and the traveling inertia of the vehicle when changing into the HEV mode from the EV mode, in order to optimally control engagement of the engine clutch 110.

In general, since the weight of a vehicle is relatively larger than that of the engine 108 and the motor 107, the hybrid controller 102 can calculate the reference speed for engaging the engine clutch 110 as a vehicle speed. The hybrid controller 102 can set the motor speed as the reference speed and the speed of the engine 108 as a relative speed, because the transmission 111 is in the normal status and the speed of the vehicle is the same as that of the motor 107, considering the gear ratio. The hybrid vehicle 102 has a problem in that when the engine 108 having relatively small inertia reaches the reference speed, the reference speed of the engine 108 relatively increases or decreases when the engine clutch 110 is engaged.

Therefore, when the reference speed (motor speed) is defined, the hybrid controller 110 controls the relative speed (engine speed) by means of the motor/generator 109 synchronized with the engine 108 or controls the relative speed (engine speed), using vehicle body driving torque from the engine 108, and determines a desired speed in order to control the relative speed.

Figure 3:
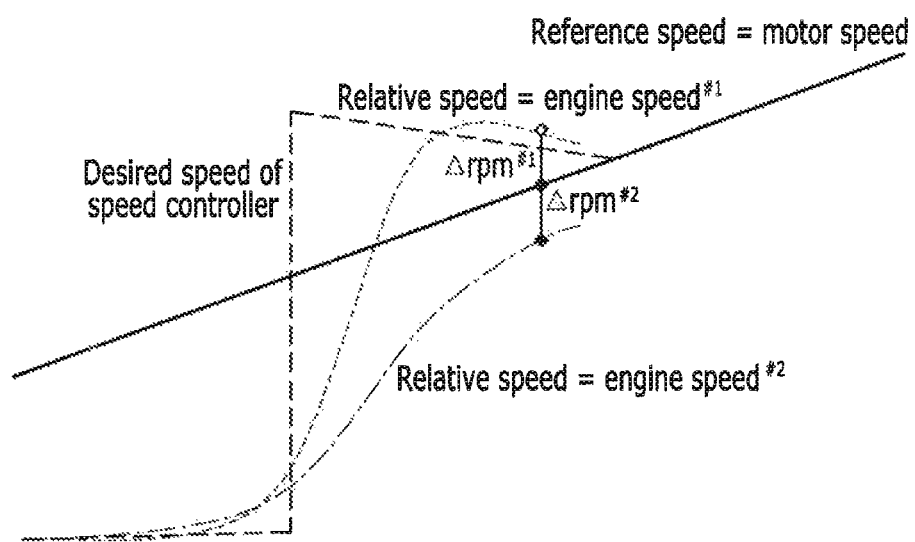
FIG. 3 is a diagram illustrating a method of setting a desired speed for controlling a relative speed of engine clutch control in a hybrid vehicle according to the exemplary embodiment of the present invention.

As shown in FIG. 3, for the rotation speed difference (Δrpm) showing the difference between the relative speed and the reference speed, the engagement performance is difference in accordance with when the relative speed is larger and lower than the reference speed (=motor speed), even with the same rotation speed difference (Δrpm), and it may be generated in accordance with the output torque of the engine clutch 110.

Accordingly, the hybrid controller 102 controls the viscous friction force of the fluid in the engine clutch 110 and the output torque of the engine 108 to be decreased, in order to overcome the problem. In particular, the desired speed is determined as reference speed±correction speed (difference between the engine output torque and a viscous friction force) so that torque is cancelled out at the slip start point (engagement timing) of the engine clutch 110.

The hybrid controller 102 can perform PI (Proportional Integral) control on the desired speed or can control the vehicle body rotation speed, using the vehicle body driving torque of the engine 108 in corporation with an EMS (Engine Management System), in order to control the rotation speed (relative speed) of the engine, using the motor/generator 109 synchronized with the engine 108.

The hybrid controller 102 calculates transmission torque of the engine clutch 110 to engage the engine clutch 110, when the reference speed and the relative speed are determined. The transmission torque is determined on the basis of the output torque of the engine and the viscous friction force of the fluid in the engine clutch.

The hybrid controller 102 calculates the transmission torque of the engine clutch 110 and determines the start point where the engine clutch 110 starts slipping (engaging). The start of slipping (engaging) of the engine clutch 110 is determined in consideration of torque f (Δrpm, fluid temperature in the clutch) due to the viscous friction force of the fluid in the engine clutch 110 and the output shaft torque of the engine 108. The output shaft torque of the engine 108 is determined by subtracting friction torque generated in the strokes of the engine from engine torque (engine inertia torque) generated by combustion in the engine.

Figure 4:
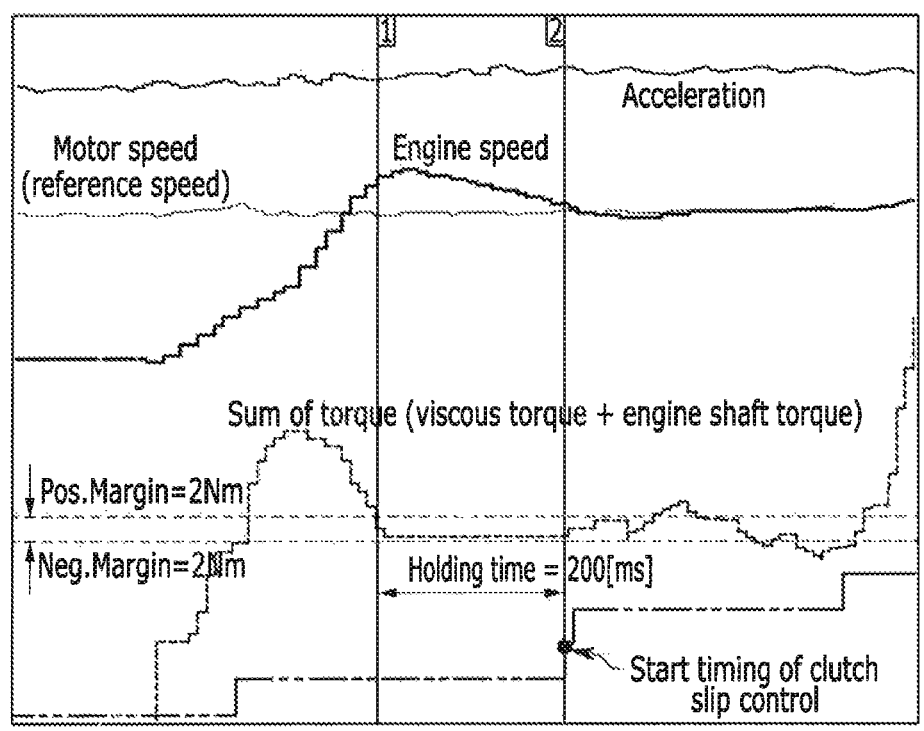
FIG. 4 is a diagram showing an engine clutch control timing in a hybrid vehicle according to the exemplary embodiment of the present invention.

Further, as can be seen from FIG. 4, the hybrid vehicle 102 controls the sum of the torque due to the viscous friction force of the fluid in the engine clutch 110 and the output torque of the engine 108 to be close to 0 [Nm]±Margin [Nm] and keeps this status for a predetermined time, and the case when the rotation speed difference (Δrpm) of the relative speed and the reference speed is within a predetermined value is the timing where the engine clutch 110 starts to be engaged.

In an exemplary embodiment of the present invention, it is possible to set a margin and a holding time by applying hysteresis to the sum of the torque (minus) due to the viscous friction force of the engine clutch 110 and the output torque (plus) of the engine 108.

Further, shock and vibration generated while the engine clutch 110 is engaged is generally caused by a change in the transmission torque at the slip (engagement) start timing, and therefore, the slip (engagement) start point of the engine clutch 110 is determined in consideration of the transmission torque too.

As described above, the hybrid controller 102 determines the reference speed and the relative speed in consideration of the inertia, and it implements the HEV mode by engaging the engine clutch 110, by controlling the amount of hydraulic pressure supplied to the engine clutch 110 through the clutch controller 106, when the transmission torque of the engine clutch 110 is included in a predetermined range and the slip start point of the engine clutch 110 is determined.

The inverter 103 is composed of a plurality of power switching elements and drives the motor 107 by converting the DC voltage supplied from the battery 104 into a 3-phase alternating voltage in response to a control signal from the hybrid controller 102. The power switching elements of the inverter 103 may be each implemented by any one of an IGBT (Insulated Gate Bipolar Transistor), a MOSFET, a transistor, and a relay.

The inverter 103 includes a protection circuit, and the protection circuit monitors the flow of power, and when an overvoltage or an overcurrent flows into the power due to various reasons such as a rear-end collision or a collision and exposure to thunder, the protection circuit protects the whole systems in a hybrid vehicle and keeps the passengers safe against high voltage.

The battery 104 is composed of a plurality of unit cells and stores a high voltage for supplying a voltage to the motor 107, for example, DC 400V or 450V.

The battery manager 105 manages the SOC by detecting the current, voltage, and temperature of the cells in an operation range and prevents reduction of lifespan due to overdischarge under a critical voltage or overcharge over the critical voltage, by controlling the charge/discharge voltage of the battery 104.

The clutch controller 106 controls a desired shift gear by controlling an actuator in the transmission 111 in response to a control signal supplied through a network from the hybrid controller 102 and allows traveling in the EV mode and the HEV mode by engaging and disengaging the engine clutch 110, by controlling the pressure of the fluid supplied to the engine clutch 110.

The motor 107 is operated by the 3-phase AC voltage applied form the inverter 103 to generate torque, and operates as a power generator and supplies regenerative energy to the battery 104 in coast down.

The engine 108 outputs first power, as a power source, when turned on.

The HSG 109 operates as a starter and a generator, starts the engine 108 in response to a control signal from the hybrid vehicle 102, and generates power by operating as a generator and supplies the generated power as a charge voltage to the battery 104 through the inverter 103, when the engine 108 keeps operating.

The engine clutch 110 is disposed between the engine 108 and the motor 107 so that traveling in the EV mode and the HEV mode can be provided.

The transmission 111 is an automatic transmission or a CVT and shifts to a desired gear by operating engagement elements and disengagement elements, using hydraulic pressure by control of the clutch controller 106.

Figure 2:
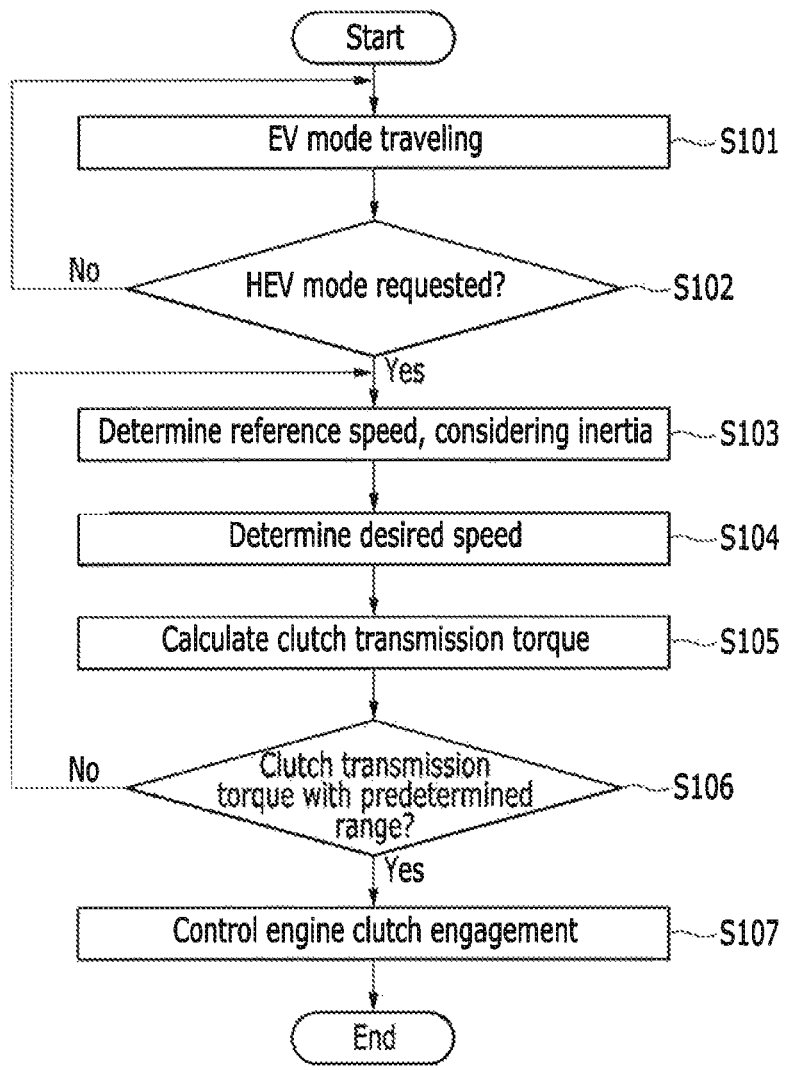
FIG. 2 is a flowchart schematically illustrating a process of controlling an engine clutch in a hybrid vehicle according to the exemplary embodiment of the present invention.

The operation of controlling an engine clutch in a hybrid vehicle according to the present invention is described with reference to FIG. 2. In particular, FIG. 2 is a flowchart illustrating a process of controlling an engine clutch in a hybrid vehicle according to an exemplary embodiment of the present invention.

While a hybrid vehicle provided with the present invention operates in the EV mode (S101), the hybrid controller 102 determines whether there is a request for changing into the HEV mode by a traveling request from the traveling information detector 101 and the SOC of the battery 104 provided by the battery manager 105 (S102). When there is a request for changing into the HEV mode from the EV mode in S102, the hybrid controller 102 determines a reference speed from the inertia of the engine 108 and the motor 107, which are power sources, and the traveling inertia of the vehicle in order to optimally control engagement of the engine clutch 110 (S103).

In general, since the traveling inertia of a vehicle is relatively larger than the inertia of the engine 108, and the inertia of the engine 108 is relatively larger than the inertia of the motor 107, the hybrid controller 102 determines the reference speed as the traveling inertia speed of the vehicle.

The hybrid controller 102 can set the motor speed as the reference speed and the speed of the engine 108 as a relative speed, because the transmission 111 is in the normal status and the speed of the vehicle is the same as that of the motor 107, considering the gear ratio.

The hybrid vehicle 102 has a problem in that when the engine 108 having relatively small inertia reaches the reference speed, the reference speed of the engine 108 increases or decreases when the engine clutch 110 is engaged.

Therefore, when the reference speed (motor speed) is defined, the hybrid controller 110 controls the relative speed (engine speed) by means of the motor/generator 109 synchronized with the engine 107 or controls the vehicle body relative speed (engine speed), using the vehicle body driving force from the engine 108, and determines a desired speed for controlling the relative speed (S104).

As shown in FIG. 3, for the rotation speed difference (Δrpm) showing the difference between the relative speed and the reference speed, the engagement performance is difference in accordance with when the relative speed is larger and lower than the reference speed (=motor speed), even with the same rotation speed difference (Δrpm), and it is generated in accordance with the magnitude of the transmission torque from the engine clutch 110.

Accordingly, the hybrid controller 102 controls the viscous friction force of the fluid in the engine clutch 110 and the output torque of the engine 108 to be decreased, in order to overcome the problem. That is, the desired speed is determined to reference speed±correction speed (difference between the engine output torque and a viscous friction force in the clutch) so that torque is cancelled out at the slip start point (engagement timing) of the engine clutch 110.

The hybrid controller 102 can perform PI (Proportional Integral) control on the desired speed or can control the vehicle body rotation speed, using the vehicle body driving torque of the engine 108 in corporation with an EMS (Engine Management System), in order to control the rotation speed (relative speed) of the engine, using the motor/generator 107 synchronized with the engine 107.

The hybrid controller 102 calculates transmission torque of the engine clutch 110 to engage the engine clutch 110, when the reference speed and the relative speed are determined (S105). The transmission torque is determined on the basis of the output torque of the engine and the viscous friction force of the fluid in the engine clutch.

In S105, the hybrid controller 102 calculates the transmission torque of the engine clutch 110 and determines the start point where the engine clutch 110 starts slipping (engaging).

The start of slipping (engaging) of the engine clutch 110 is determined in consideration of torque f (Δrpm, fluid temperature) due to the viscous friction force of the fluid in the engine clutch 110 and the output shaft torque of the engine 108.

The output shaft torque of the engine 108 is determined by subtracting friction torque generated in the strokes of the engine from engine torque (engine inertia torque) generated by combustion in the engine 108.

Further, as can be seen from FIG. 4, the hybrid vehicle 102 controls the sum of the torque due to the viscous friction force of the fluid in the engine clutch 110 and the torque from the output shaft of the engine 108 to be close to 0 [Nm]±Margin [Nm] and keeps this status for a predetermined time, and determines that it is the slip (engaging) start timing of the engine clutch 110, when the rotation speed difference (Δrpm) of the relative speed and the reference speed is within a predetermined value (S106).

In an exemplary embodiment of the present invention, it is possible to set a margin and a holding time by applying hysteresis to the sum of the torque (minus) due to the viscous friction force of the engine clutch 110 and the torque from the output shaft (plus) of the engine 108.

Further, shock and vibration generated while the engine clutch 110 is engaged is generally caused by a change in the transmission torque at the slip (engagement) start timing, and therefore, the slip (engagement) start point of the engine clutch 110 is determined in consideration of the transmission torque too.

As described above, the hybrid controller 102 determines the reference speed and the relative speed in consideration of the inertia, and it implements the HEV mode by engaging the engine clutch 110, by controlling the amount of hydraulic pressure supplied to the engine clutch 110 through the clutch controller 106, when the transmission torque of the engine clutch 110 is included in a predetermined range and the slip start point of the engine clutch 110 is determined (S107).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An engine clutch control system for a hybrid vehicle, comprising:
   a power source including an engine and a motor;
   an engine clutch disposed between the engine and the motor;
   a traveling information detector that detects traveling information including at least one of a vehicle speed, a shift gear, displacement of an accelerator pedal, and displacement of a brake pedal; and
   a hybrid controller performing an EV mode or an HEV mode by controlling disengagement or engagement of the engine clutch,
   wherein the hybrid controller controls engagement of the engine clutch in accordance with inertia of the vehicle and transmission torque from the engine clutch, if there is a request for changing into the HEV mode from the EV mode.

2. The system of claim 1, wherein the inertia of the vehicle includes inertia of the power source and traveling inertia.

3. The system of claim 2, wherein the hybrid controller determines a reference speed from the inertia of the power source and the traveling inertia and engages the engine clutch by applying hydraulic pressure when an amount of torque transmitted through the engine clutch is included in a predetermined range.

4. The system of claim 3, wherein the hybrid controller determines the reference speed on the basis of the traveling inertia of the vehicle.

5. The system of claim 3, wherein the hybrid controller controls the reference speed by controlling any one of the motor and the engine, when the hybrid controller determines a speed of the engine as a relative speed is determined.

6. The system of claim 3, wherein the hybrid controller calculates transmission torque of the engine clutch to engage the engine clutch, when the reference speed and a speed of the engine as a relative speed are determined.

7. The system of claim 6, wherein the hybrid controller determines a start point where the engine clutch starts to be engaged in accordance with the magnitude of torque F (Δrpm, fluid temperature in the clutch) due to the viscous friction force of fluid in the engine clutch and the torque from the output shaft of the engine in order to calculate the transmission torque from the engine clutch.

8. The system of claim 7, wherein the hybrid controller determines the torque from the output shaft of the engine by subtracting friction torque generated in the strokes of the engine from engine torque (engine inertia torque) generated by combustion in the engine.

9. The system of claim 7, wherein the hybrid controller controls the sum of the torque due to the viscous friction force of the fluid in the engine clutch and the output torque of the engine to be close to 0 [Nm]±Margin [Nm] and keeps this status for a predetermined time, determines that it is the start point where the engine clutch starts slipping (engaging) and controls engagement of the engine clutch, when the rotation speed difference (Δrpm) of the engine speed and the motor speed is within a predetermined value.

10. The system of claim 9, wherein the hybrid controller sets a margin and a holding time by applying hysteresis to the sum (transmission torque) of the torque due to the viscous friction force of the engine clutch and the torque from the output shaft of the engine.

11. The system of claim 1, wherein the hybrid controller controls viscous friction force of fluid in the engine clutch and torque from the output of the engine, and determines a desired speed as reference speed±correction speed (difference between the output torque of the engine and a viscous friction force in the engine clutch) so that there is no torque at a slip start point (engagement timing) of the engine clutch.

12. The system of claim 11, wherein the hybrid controller controls an engine speed that is the relative speed by performing PI control on a motor/generator synchronized with the engine, or controls the rotation speed of the engine with reference to the desired speed in cooperation with an EMS.

13. A method of controlling an engine clutch for a hybrid vehicle, the method comprising:
    determining whether there is a request for changing into an HEV mode from an EV mode;
    determining a reference speed from traveling inertia of the vehicle and inertia of an engine and a motor when there is the request for changing into the HEV mode;
    determining a desired speed for controlling the determined reference speed; and
    calculating transmission torque of the engine clutch, and engaging the engine clutch, when the transmission torque of the engine clutch is provided in a predetermined range.

14. The method of claim 13, wherein the reference speed is determined on the basis of a traveling inertia speed of the vehicle, because the traveling inertia of the vehicle is larger than the inertia of the engine, and the inertia of the engine is larger than the inertia of the motor.

15. A hybrid vehicle, comprising:
    a power source including an engine and a motor;
    an engine clutch disposed between the engine and the motor; and
    an engine clutch control system comprising:
    a hybrid controller performing an EV mode or an HEV mode by controlling disengagement or engagement of the engine clutch,
    wherein the hybrid controller controls engagement of the engine clutch in accordance with inertia of the vehicle and transmission torque from the engine clutch, if there is a request for changing into the HEV mode from the EV mode.

16. The hybrid vehicle of claim 15, wherein the inertia of the vehicle includes inertia of the power source and traveling inertia.

17. The hybrid vehicle of claim 16, wherein the hybrid controller determines a reference speed from the inertia of the power source and the traveling inertia and engages the engine clutch by applying hydraulic pressure when an amount of torque transmitted through the engine clutch is included in a predetermined range.

18. The hybrid vehicle of claim 17, wherein the hybrid controller determines the reference speed on the basis of the traveling inertia of the vehicle.

* * * * *